(12) United States Patent
Stevens et al.

(10) Patent No.: US 12,098,296 B2
(45) Date of Patent: *Sep. 24, 2024

(54) LOW ODOR WATER-BASED COATING COMPOSITION

(71) Applicant: SWIMC LLC, Cleveland, OH (US)

(72) Inventors: Emile Stevens, VD Udenhout (NL); Andrew Hearley, Minneapolis, MN (US)

(73) Assignee: SWIMC LLC, Cleveland, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 18/302,469

(22) Filed: Apr. 18, 2023

(65) Prior Publication Data

US 2023/0340273 A1 Oct. 26, 2023

Related U.S. Application Data

(63) Continuation of application No. 16/463,161, filed as application No. PCT/US2017/063044 on Nov. 22, 2017, now Pat. No. 11,634,588.

(60) Provisional application No. 62/425,385, filed on Nov. 22, 2016.

(51) Int. Cl.
| | |
|---|---|
| *C09D 5/33* | (2006.01) |
| *C09D 5/02* | (2006.01) |
| *C09D 7/63* | (2018.01) |
| *C09D 133/02* | (2006.01) |
| *C09D 179/02* | (2006.01) |

(52) U.S. Cl.
CPC .............. *C09D 5/004* (2013.01); *C09D 5/022* (2013.01); *C09D 7/63* (2018.01); *C09D 133/02* (2013.01); *C09D 179/02* (2013.01)

(58) Field of Classification Search
CPC .......... C09D 5/004; C09D 7/63; C09D 5/022; C09D 133/02; C09D 179/02
USPC ....................................................... 523/172
See application file for complete search history.

(56) References Cited

U.S. PATENT DOCUMENTS

| | | | | |
|---|---|---|---|---|
| 5,527,853 | A | * | 6/1996 | Landy .................. C04B 41/63 524/521 |
| 5,820,993 | A | * | 10/1998 | Schall .................... C08F 8/42 428/447 |
| 6,075,079 | A | * | 6/2000 | Helmer ............... C09D 133/06 524/253 |
| 7,834,086 | B2 | | 11/2010 | Killilea et al. |
| 8,658,286 | B2 | | 2/2014 | Killilea et al. |
| 9,359,520 | B2 | | 6/2016 | Killilea et al. |
| 11,634,588 | B2 | | 4/2023 | Stevens et al. |

FOREIGN PATENT DOCUMENTS

| | | |
|---|---|---|
| CN | 1168152 A | 12/1997 |
| CN | 1039339 C | 7/1998 |
| CN | 1307622 A | 8/2001 |
| EP | 0136842 A2 | 9/1984 |
| EP | 0409459 B2 | 1/1991 |
| EP | 1505127 A1 | 2/2005 |
| JP | S5910373 A | 1/1984 |
| WO | 96/22338 A2 | 7/1996 |
| WO | 2008/100608 A2 | 8/2008 |

OTHER PUBLICATIONS

Extended European Search Report from related European Patent Appl'n No. 17874079.1, mailed Jun. 19, 2020.
International Preliminary Report on Patentability from International Application No. PCT/US2017/063044, mailed Jun. 6, 2019.
International Search Report and Written Opinion from International Application No. PCT/US2017/063044, mailed Jan. 29, 2018.

* cited by examiner

*Primary Examiner* — Hui H Chin

(74) *Attorney, Agent, or Firm* — Merchant and Gould, PC

(57) ABSTRACT

A low odor aqueous quick-drying coating composition is described. The composition is a water based latex coating composition that includes a binder component with at least one copolymer and a neutralizing component. The composition dries in less than about 10 minutes at a temperature between about 5° C. to 35° C. and a relative humidity between about 30% and 95% and has a pH of 9.5 or less. The coating composition may be used for applications such as road marking and coating exterior surfaces, where use of a low-odor coating is desired.

17 Claims, 15 Drawing Sheets

LOW ODOR WATER-BASED COATING COMPOSITION

CROSS-REFERENCE TO RELATED APPLICATIONS

This application is a continuation of U.S. application Ser. No. 16/463,161 filed on May 5, 2019; which claims benefit to International Patent Application No. PCT/US2017/063044 filed on Nov. 22, 2017; which claims benefit of U.S. Provisional Application Ser. No. 62/425,385 filed on Nov. 22, 2016; the disclosures of each of which are hereby incorporated by reference in their entireties.

BACKGROUND OF THE INVENTION

Conventionally, traffic or road marking paints are solvent-based coating compositions that provide hard, smear-resistant, durable coatings capable of withstanding wear and tear from regular traffic and from various weather conditions. These compositions are designed to dry as quickly as possible under ambient conditions of temperature and relative humidity to allow normal road traffic to continue with minimal interruption. These compositions dry rapidly by evaporation of the solvent from the paint film.

Due to increasing regulatory and environmental concerns, water-based compositions are now used in a variety of applications because of their lower toxicity and low volatile organic compound (VOC) content. These compositions are preferred coatings for many substrates such as concrete, asphalt, stone, masonry, and other architectural surfaces.

When water-based compositions are used in traffic or road marking applications, the drying time for the paint tends to be slow because of the high heat of vaporization of water relative to organic solvents. Previous efforts to produce fast drying water-based compositions have been successful, but these compositions often included volatile compounds like ammonia and produce a strong and undesirable odor. The strong odor combined with a desire to reduce emissions has limited the use of existing water-based technologies in various areas, including as traffic or road marking paint.

Accordingly, there is a need for water-based or aqueous coating compositions that have optimal performance characteristics with respect to dry time, durability, abrasion, and the like, but do not demonstrate a strong and undesirable ammonia odor.

SUMMARY

Figure 1:
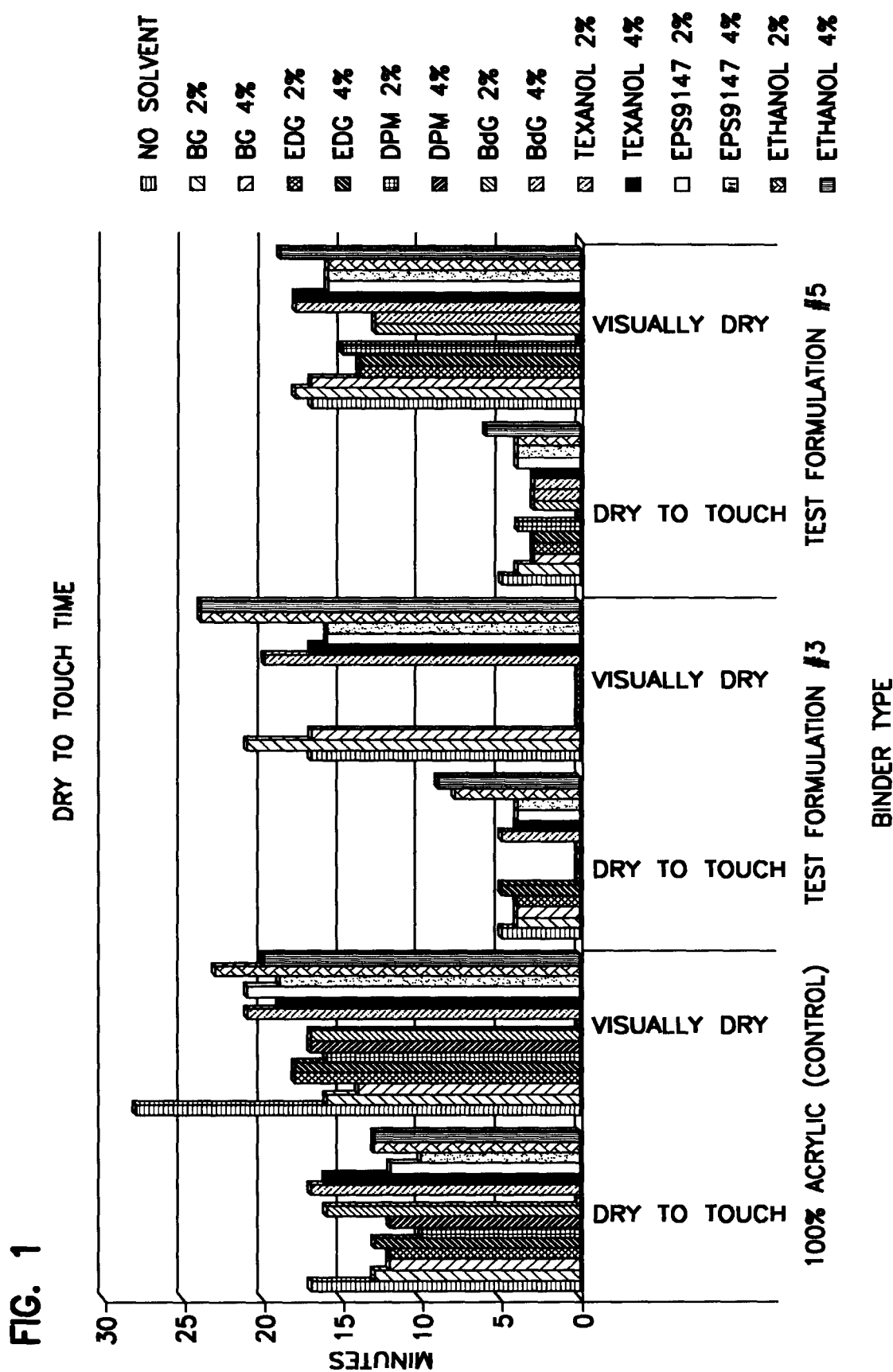
FIG. 1 is a graphical illustration of dry to touch times.
Figure 2A:
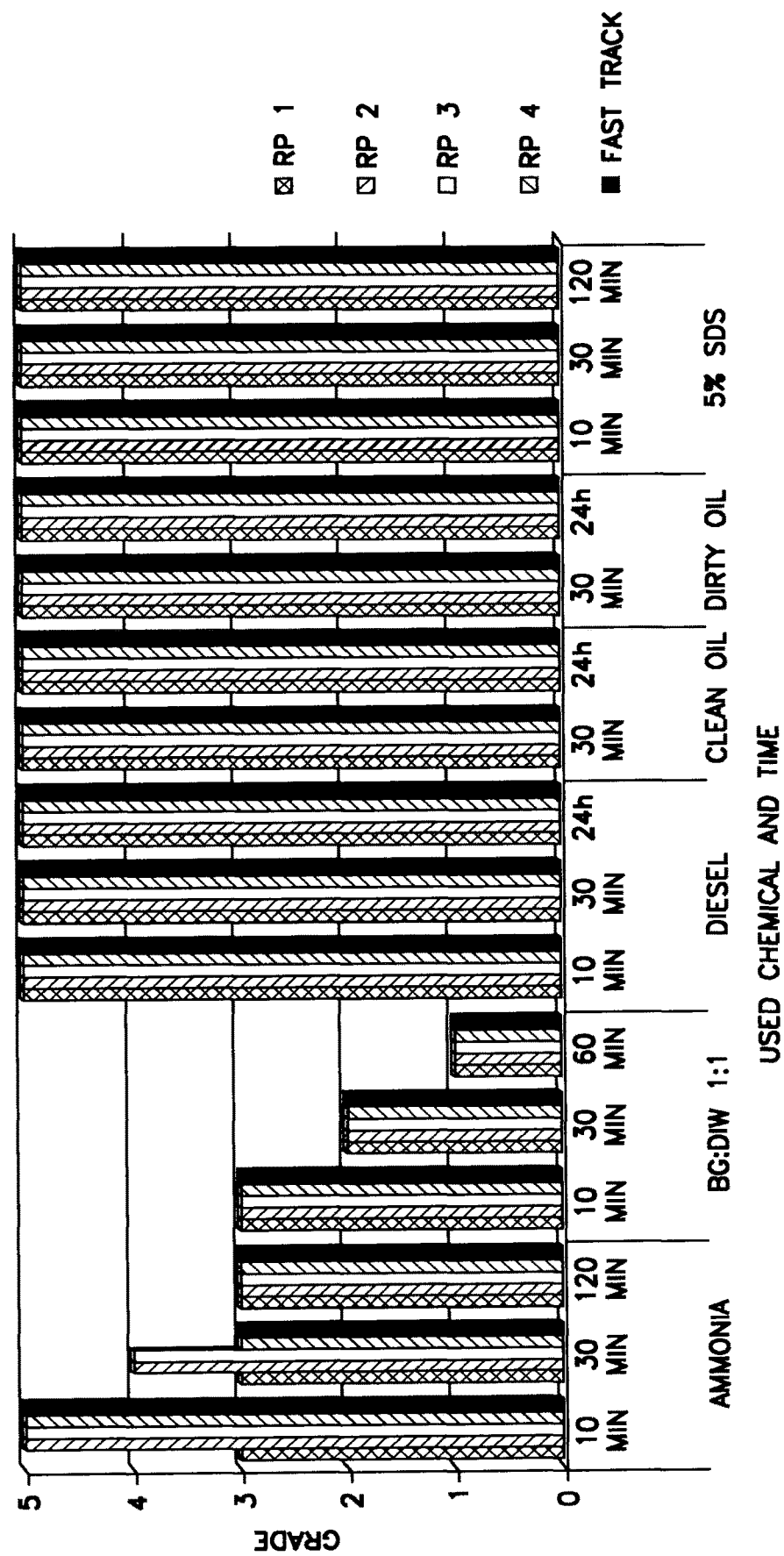
FIG. 2A is a graphical illustration of chemical resistance of the coating composition.
Figure 2B:
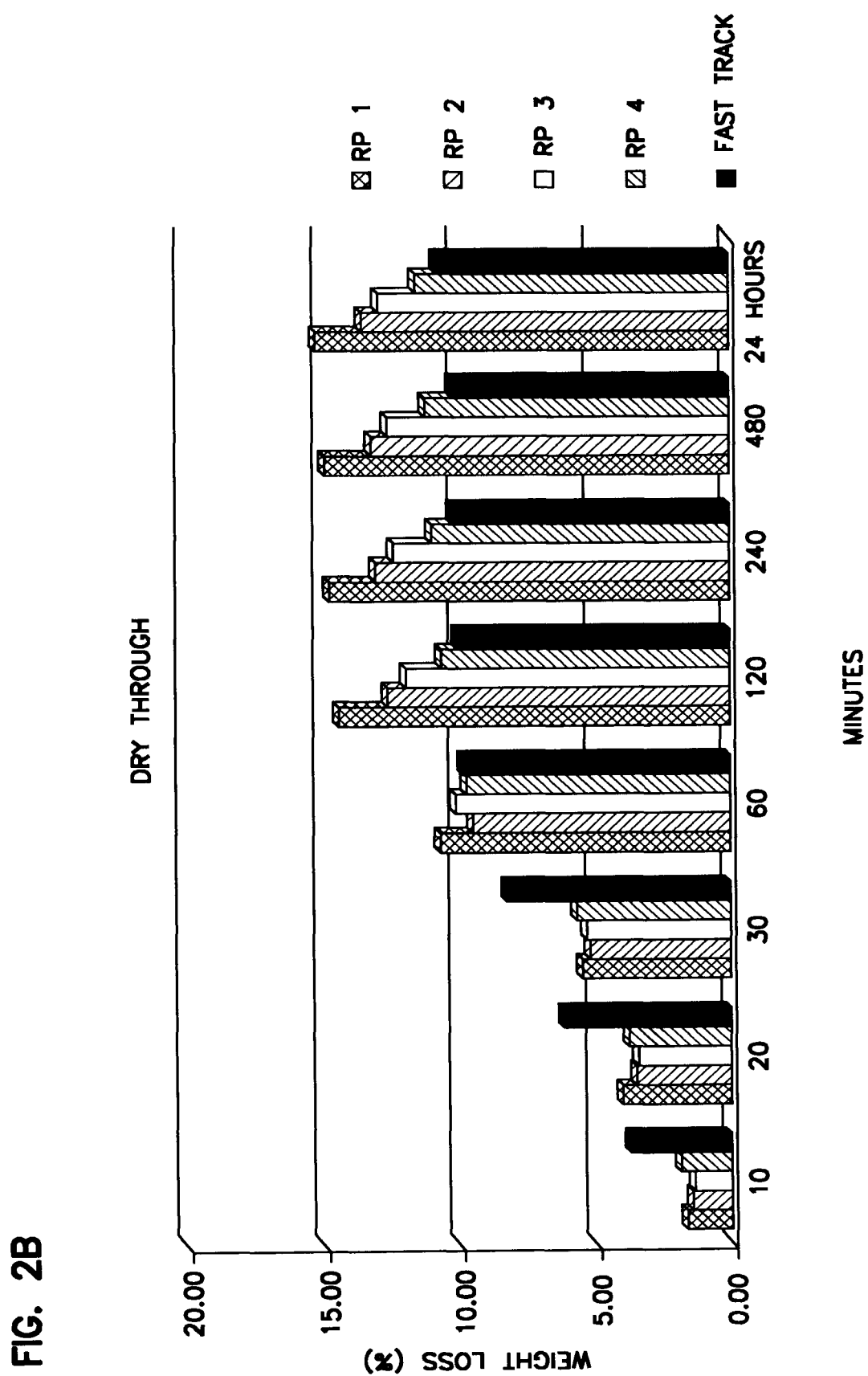
FIG. 2B is a graphical illustration of dry through results of the coating composition.
Figure 2C:
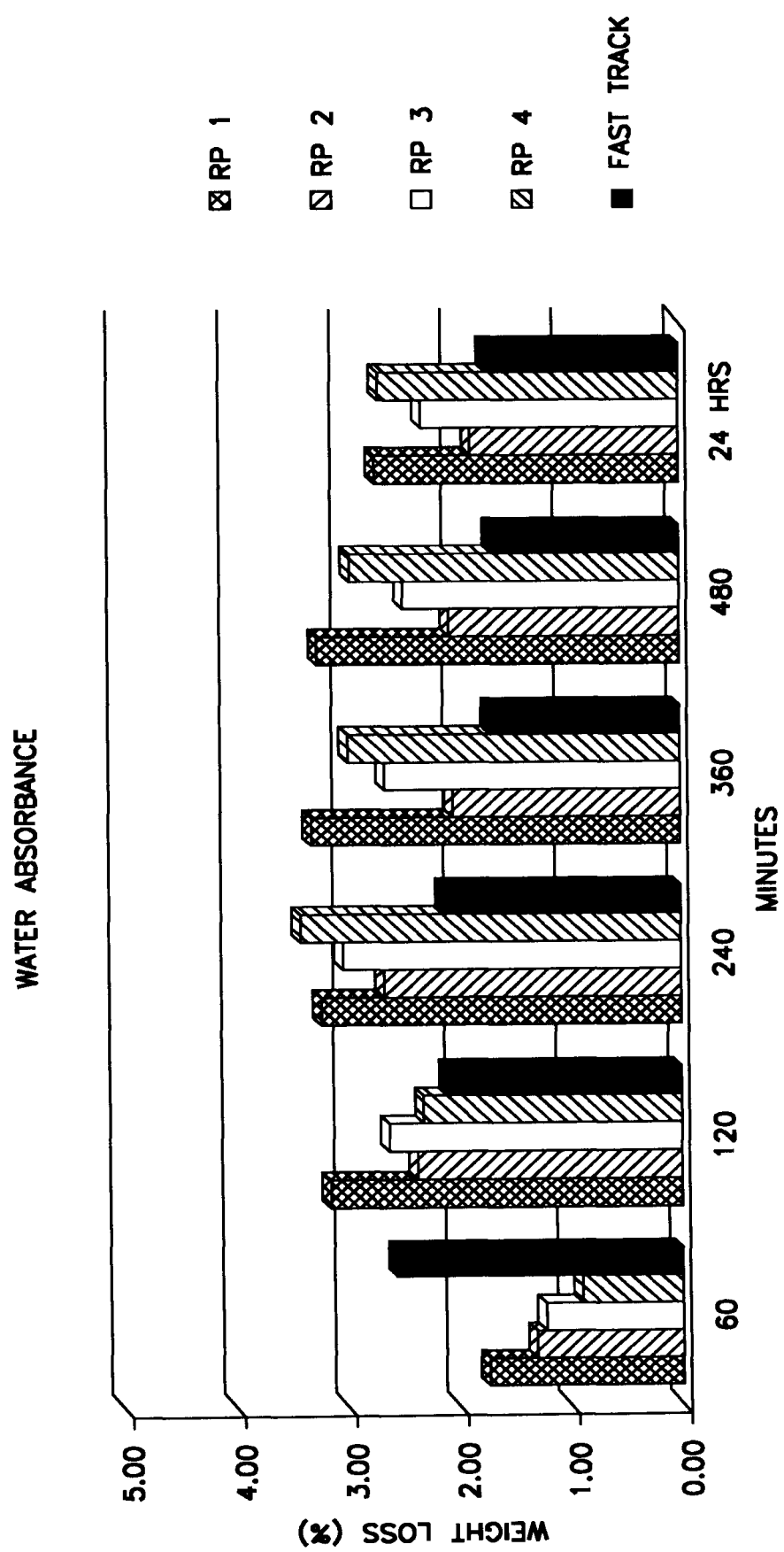
FIG. 2C is a graphical illustration of water absorbance of the coating composition.
Figure 2D:
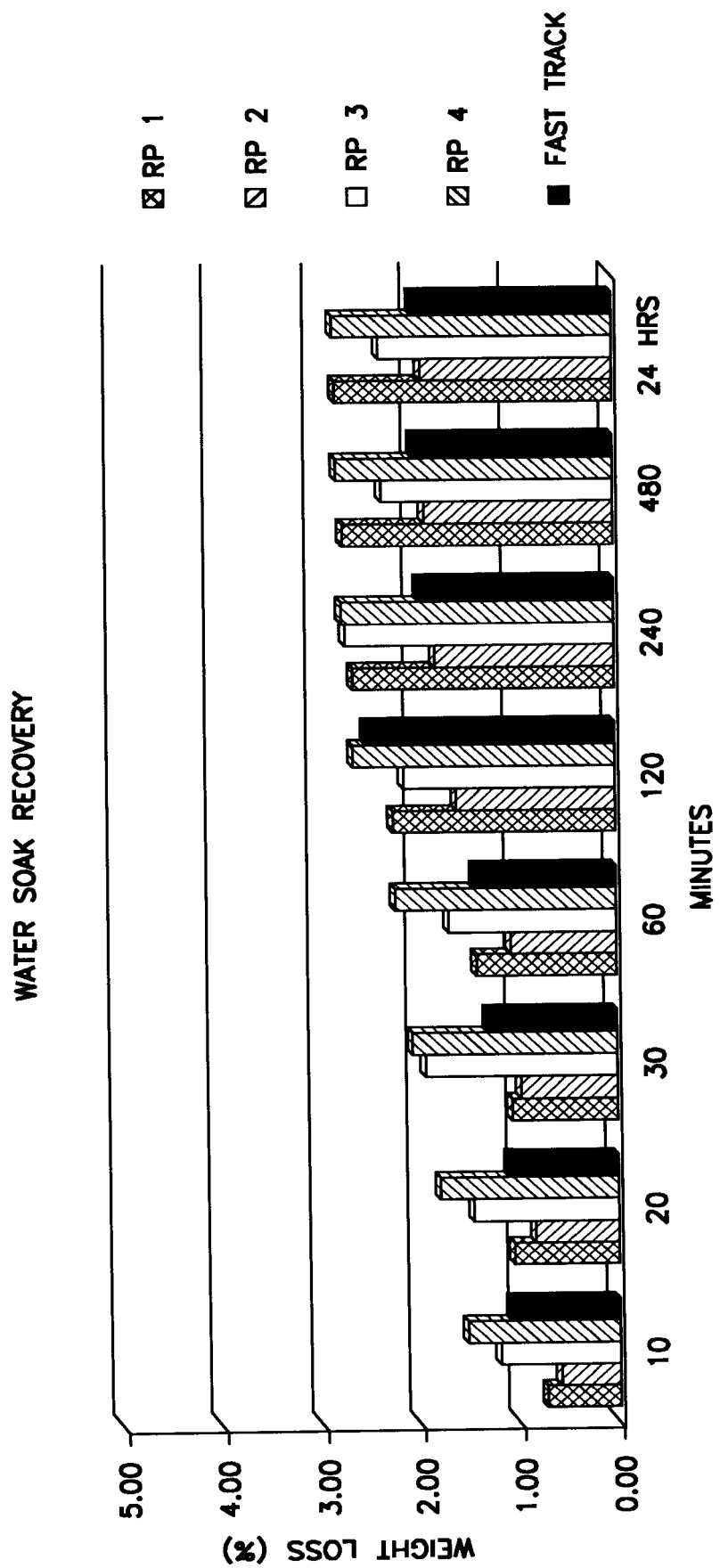
FIG. 2D is a graphical illustration of water soak recovery of the coating composition.
Figure 2E:
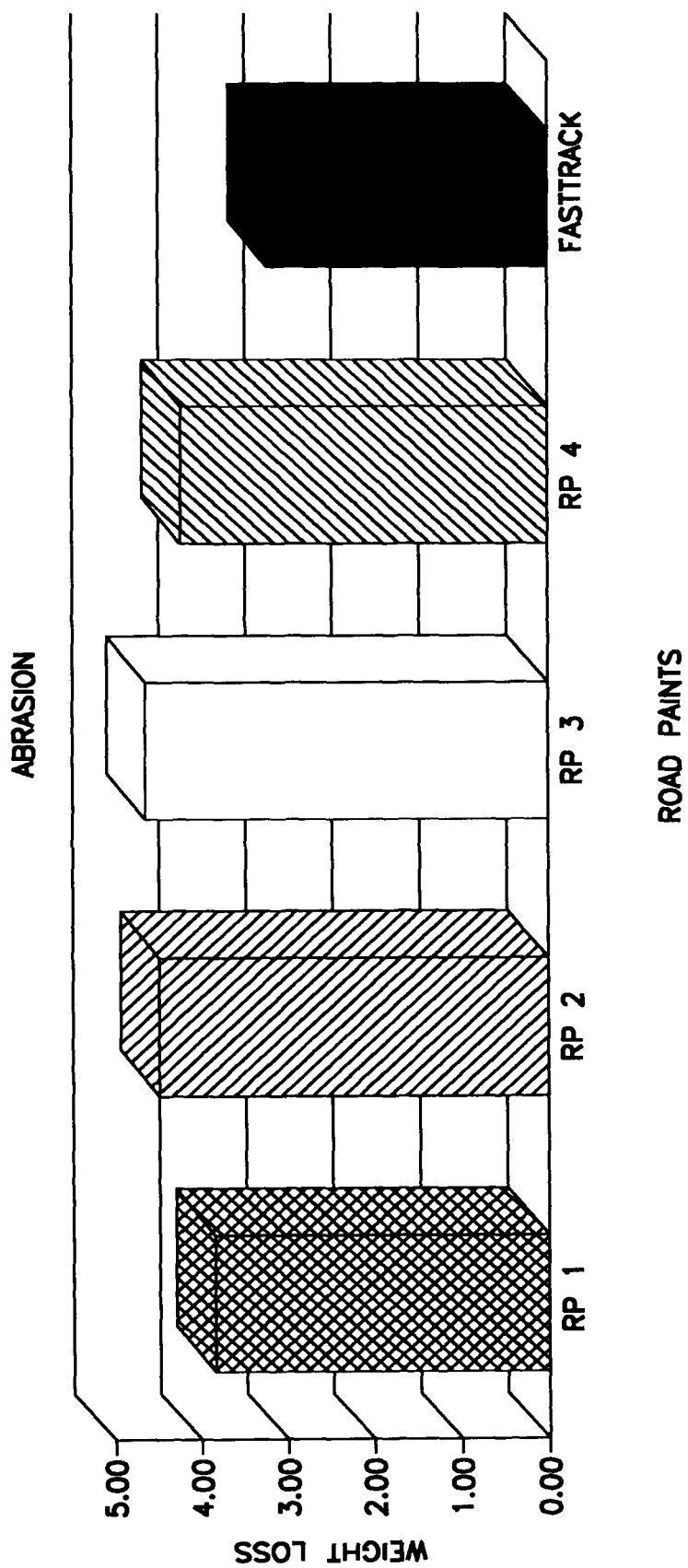
FIG. 2E is a graphical illustration of abrasion results of the coating composition.
Figure 3A:
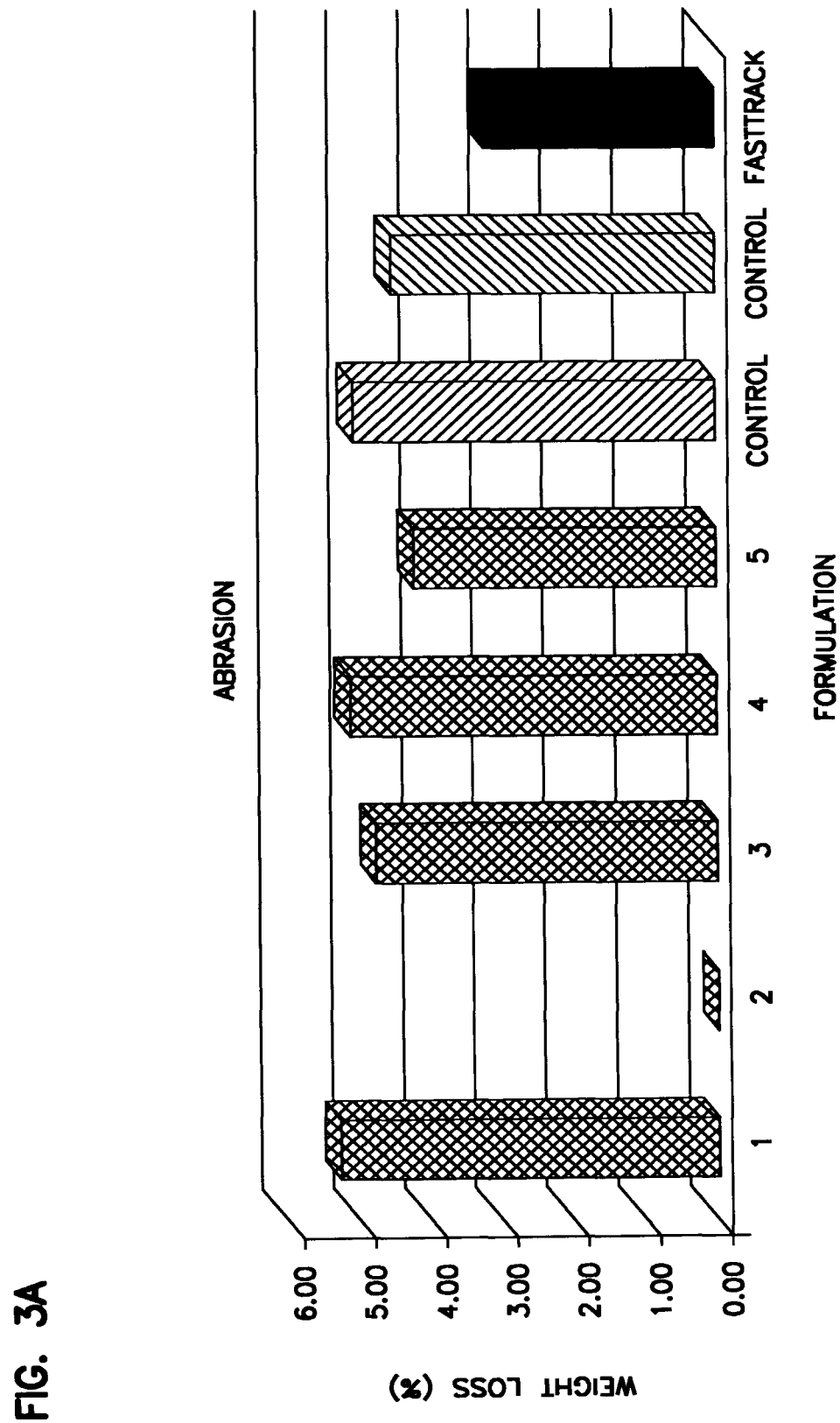
FIG. 3A is a graphical illustration of abrasion results of the coating composition.
Figure 3B:
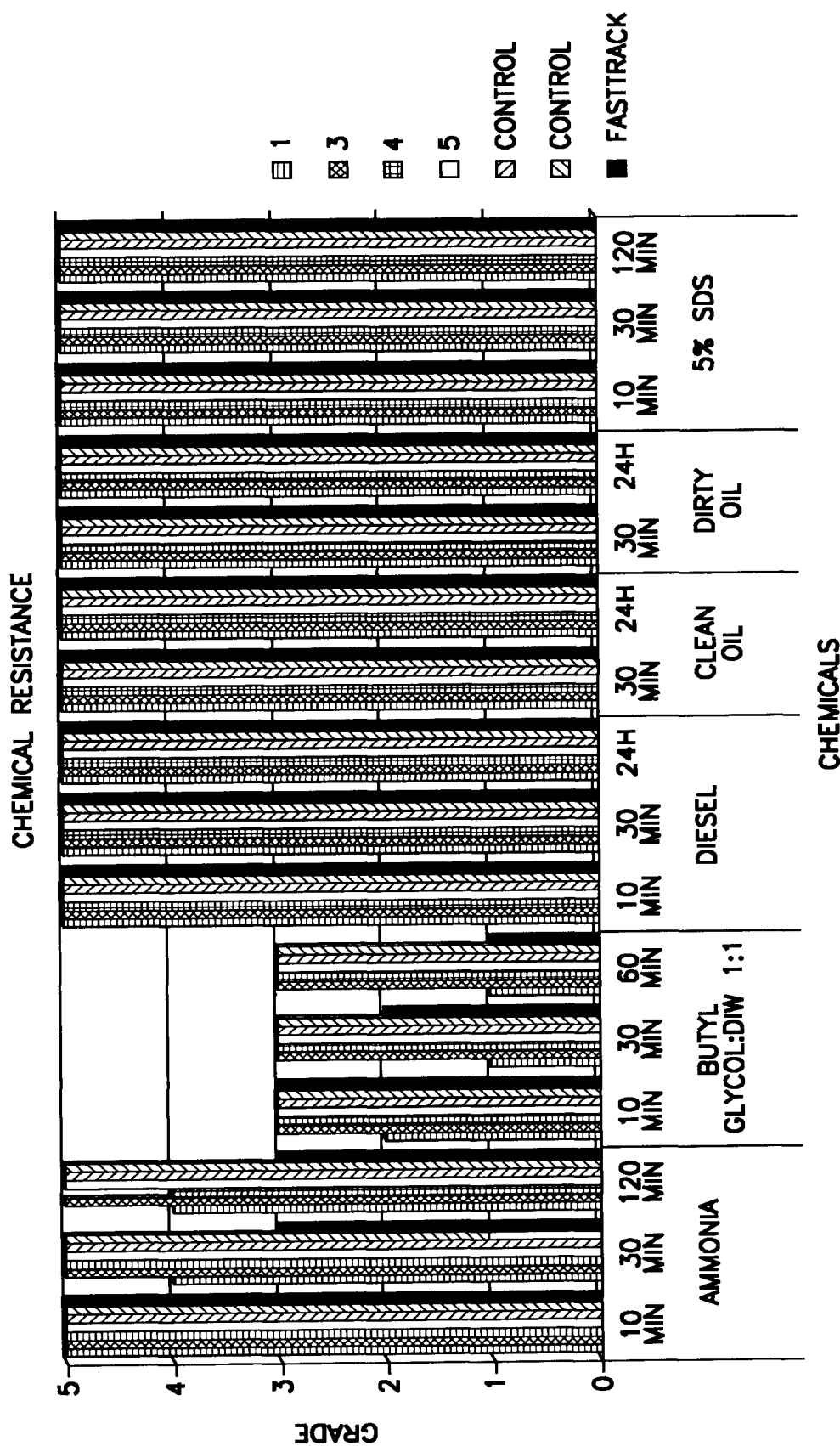
FIG. 3B is a graphical illustration of chemical resistance of the coating composition.
Figure 3C:
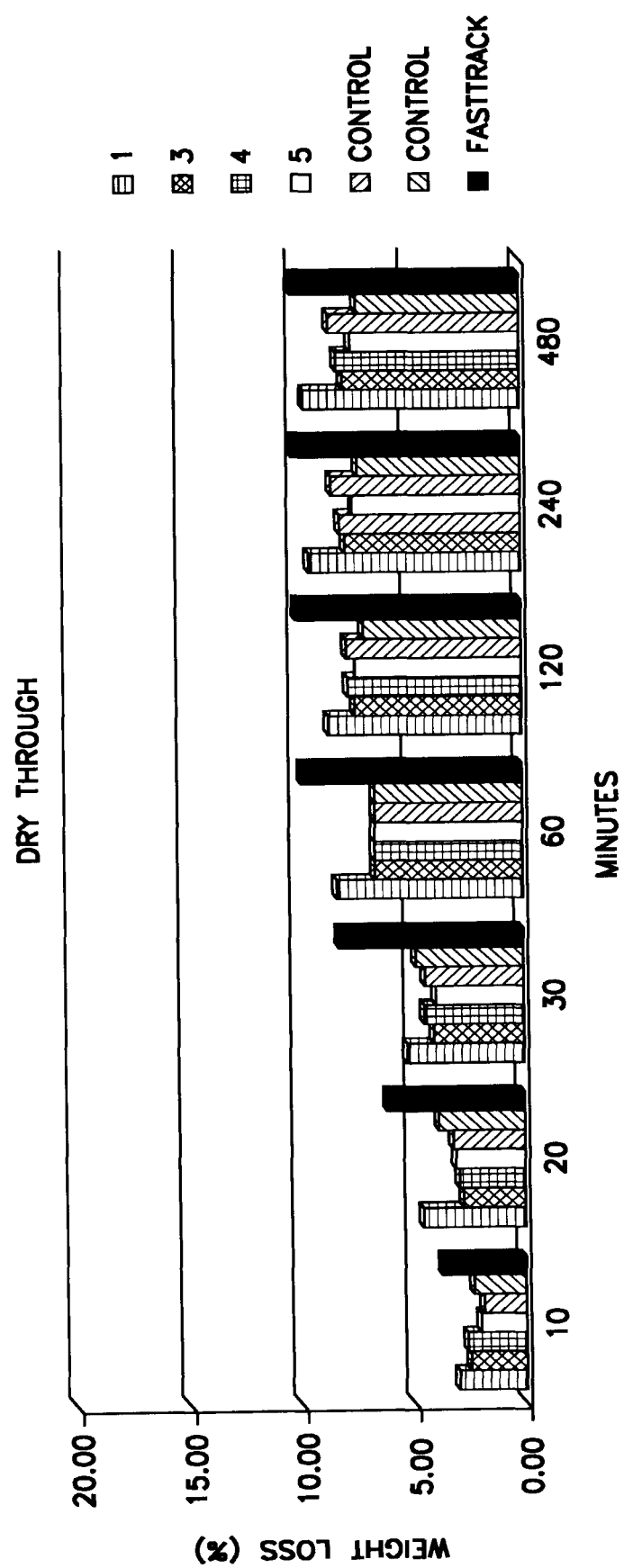
FIG. 3C is a graphical illustration of dry through results of the coating composition.
Figure 3D:
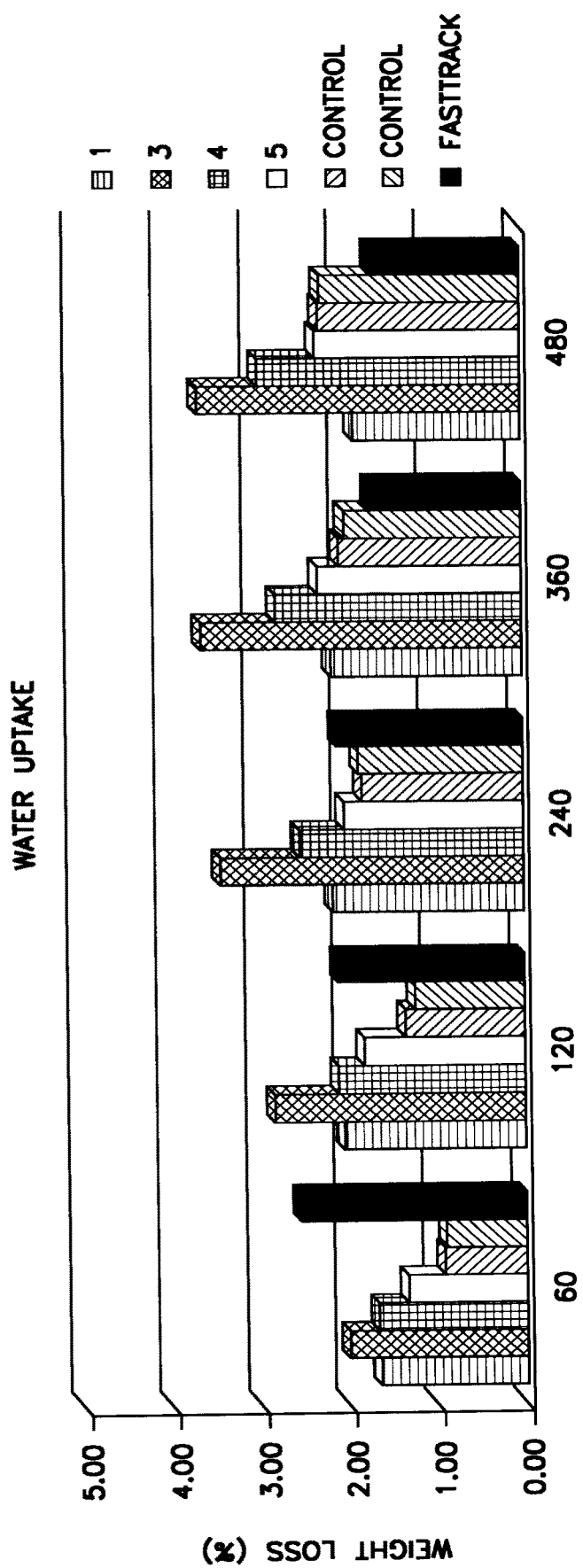
FIG. 3D is a graphical illustration of water uptake of the coating composition.
Figure 3E:
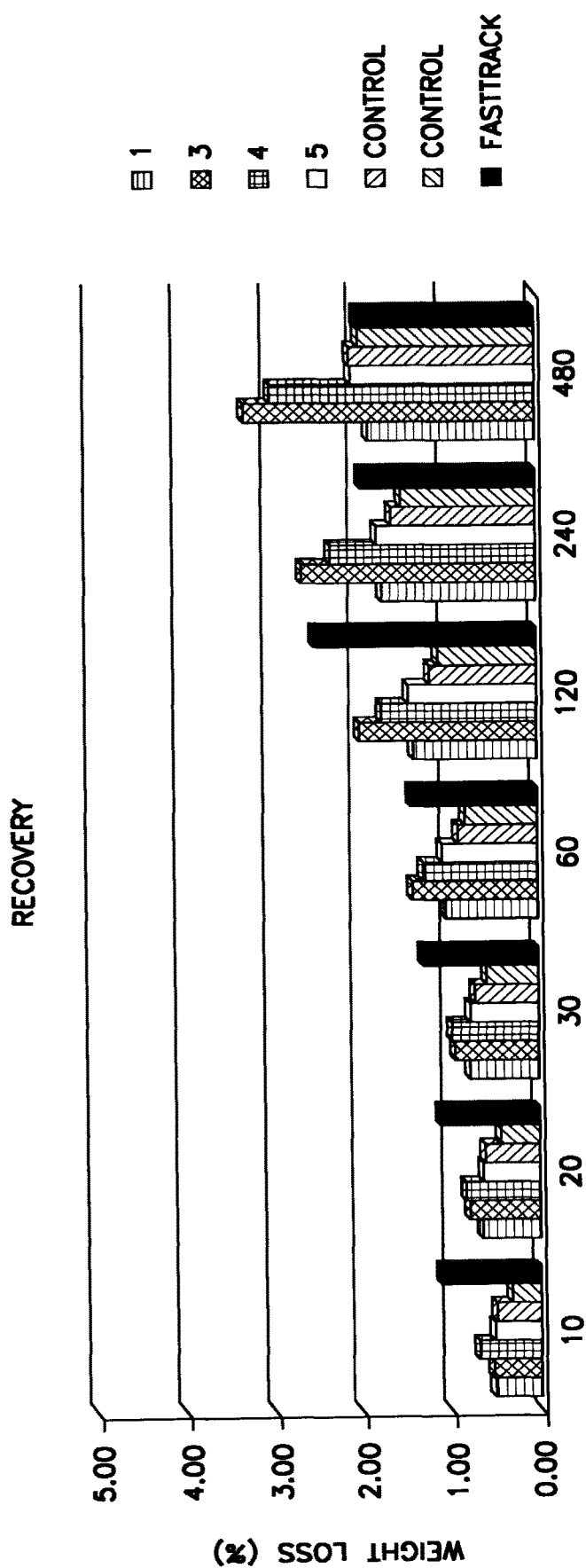
FIG. 3E is a graphical illustration of recovery of the coating composition.
Figure 4A:
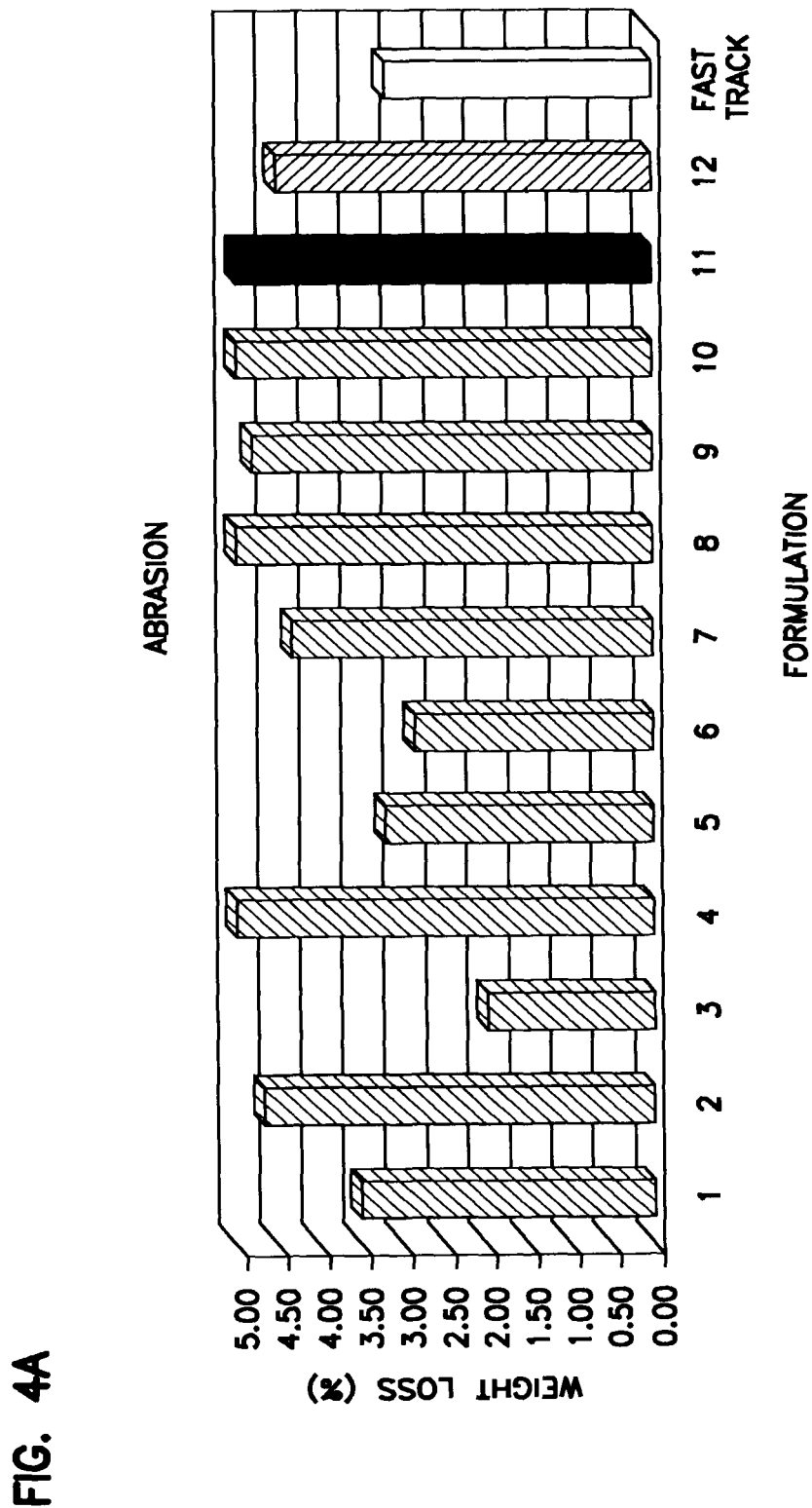
FIG. 4A is a graphical illustration of abrasion results of the coating composition.
Figure 4B:
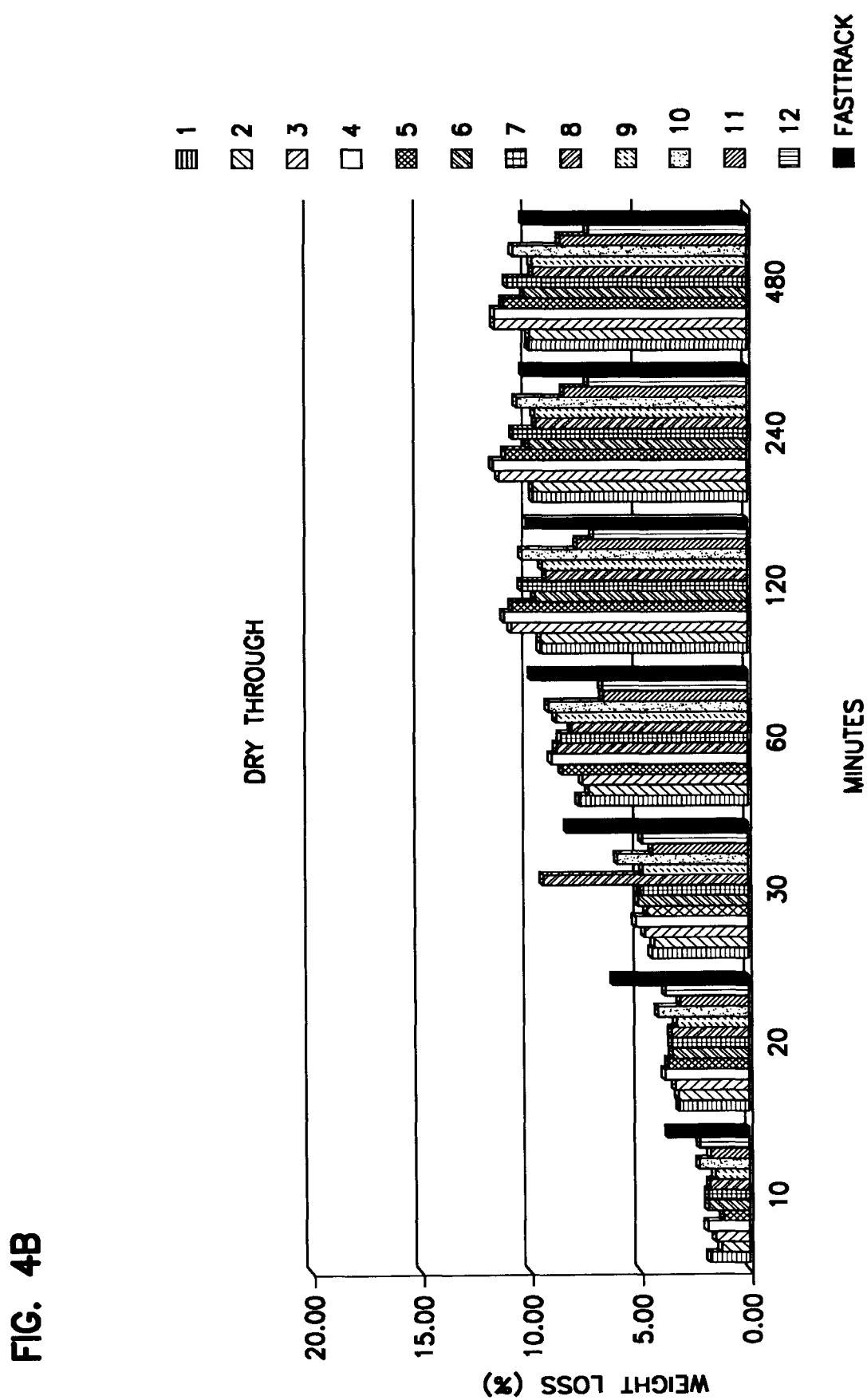
FIG. 4B is a graphical illustration of dry through results of the coating composition.
Figure 4C:
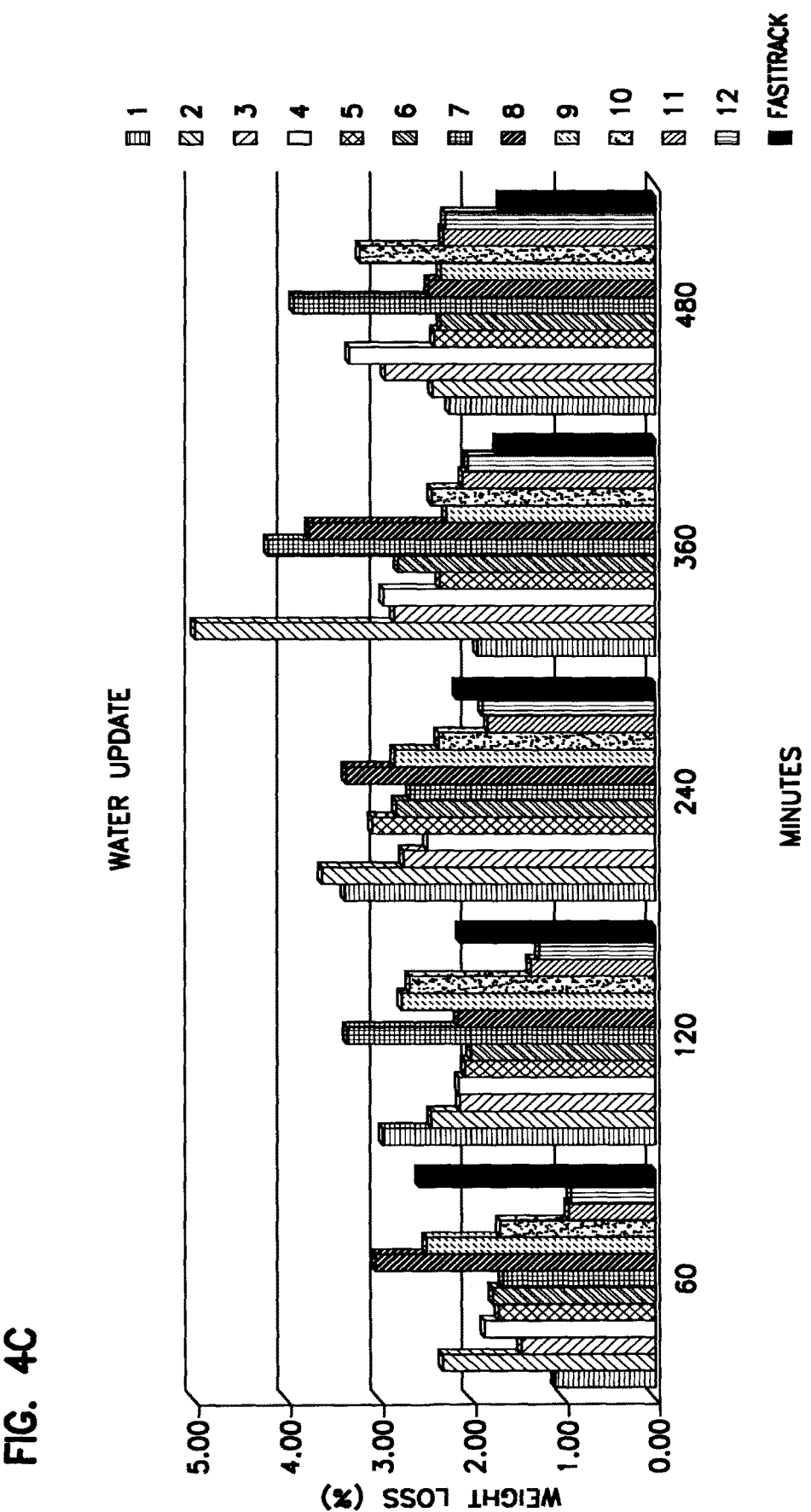
FIG. 4C is a graphical illustration of water uptake of the coating composition.
Figure 4D:
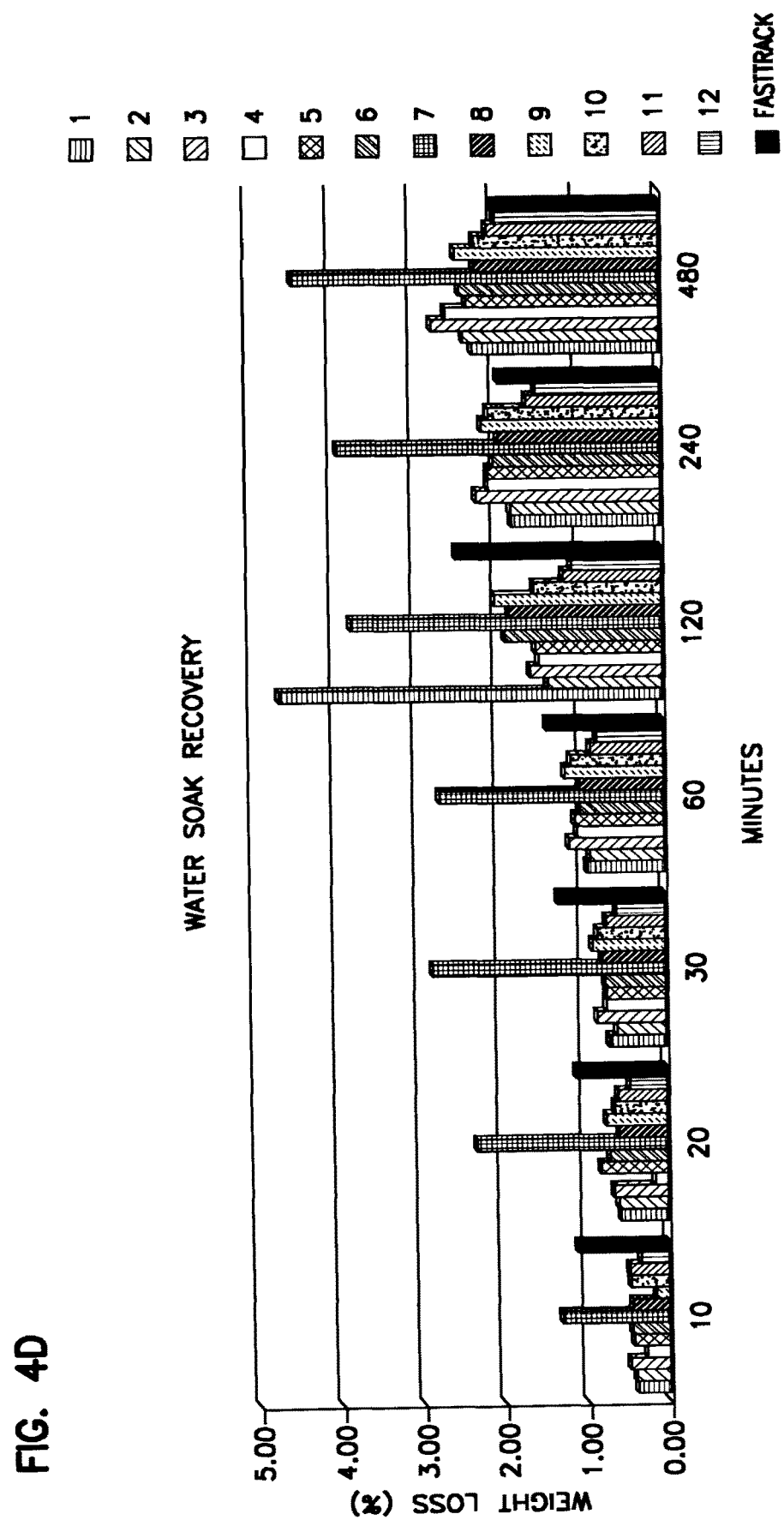
FIG. 4D is a graphical illustration of water soak recovery of the coating composition.

The present description provides a low odor water-based, quick drying coating composition. The composition described herein is particularly advantageous when used as a road marking paint because the paint has low odor relative to conventional road marking paints. The coating composition dries rapidly at ambient temperature without the application of heat or other drying means.

In an embodiment, the present description provides a low odor aqueous coating composition. The composition includes a binder component having at least one copolymer and a neutralizing component. The composition dries in less than about 10 minutes at a temperature between about 5 to 35° C. and a relative humidity between about 30 and 95%.

In another embodiment, the present description provides a method for making a low odor aqueous coating composition. The method includes providing a first resin component. The first resin component includes a latex polymer derived from one or more ethylenically unsaturated monomers. A second resin component is provided which includes a low molecular weight polyamino-functional polymer. The first and second resin components are combined to form a copolymer blend. A neutralizing component is provided and added to the copolymer blend.

The above summary of the present invention is not intended to describe each disclosed embodiment or every implementation of the present invention. The description that follows more particularly exemplifies illustrative embodiments. In several places throughout the application, guidance is provided through lists of examples, which can be used in various combinations. In each instance, the recited list serves only as a representative group and should not be interpreted as an exclusive list.

The details of one or more embodiments of the invention are set forth in the accompanying drawings and the description below. Other features, objects, and advantages of the invention will be apparent from the description and drawings, and from the claims.

SELECTED DEFINITIONS

Unless otherwise specified, the following terms as used herein have the meanings as provided below.

The term "component" refers to any compound that includes a particular feature or structure. Examples of components include compounds, monomers, oligomers, polymers, and organic groups contained therein.

The term "substantially free" of a particular compound means that the compositions described herein contain less than 0.5 wt % of the compound. The term "essentially free" of a particular compound means that the compositions of the present invention contain less than about 0.1% of the compound.

As used herein, the term "organic group" means a hydrocarbon group (with optional elements other than carbon and hydrogen, such as oxygen, nitrogen, sulfur, and silicon) that is classified as an aliphatic group, cyclic group, or combination of aliphatic and cyclic groups (e.g., alkaryl and aralkyl groups). The term "aliphatic group" means a saturated or unsaturated linear or branched hydrocarbon group. This term is used to encompass alkyl, alkenyl, and alkynyl groups, for example. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkenyl group" means an unsaturated, linear or branched hydrocarbon group with one or more carbon-carbon double bonds, such as a vinyl group. The term "alkynyl group" means an unsaturated, linear or branched hydrocarbon group with one or more carbon-carbon triple bonds. The term "cyclic group" means a closed ring hydrocarbon group that is classified as an alicyclic group or an aromatic group, both of which can include heteroatoms. The term "alicyclic group" means a cyclic hydrocarbon group having properties resembling those of aliphatic groups. The term "Ar" refers to a divalent aryl group (i.e., an arylene group), which refers to a closed aromatic ring or ring system such as phenylene, naphthylene, biphenylene, fluorenylene, and indenyl, as well as heteroarylene groups (i.e., a closed ring hydrocarbon in which one or more of the atoms in the ring is an element other than carbon (e.g., nitrogen, oxygen, sulfur, etc.)). Suitable heteroaryl groups include furyl, thienyl, pyridyl, quinolinyl, isoquinolinyl, indolyl, isoindolyl, triazolyl, pyrrolyl, tetrazolyl, imidazolyl, pyrazolyl, oxazolyl, thiazolyl, benzofuranyl, benzothiophenyl, carbazolyl, benzoxazolyl, pyrimidinyl, benzimidazolyl, quinoxalinyl, benzothiazolyl, naphthyridinyl, isoxazolyl, isothiazolyl, purinyl, quinazolinyl, pyrazinyl, 1-oxidopyridyl, pyridazinyl, triazinyl, tetrazinyl, oxadiazolyl, thiadiazolyl, and so on. When such groups are divalent, they are typically referred to as "heteroarylene" groups (e.g., furylene, pyridylene, etc.).

A group that may be the same or different is referred to as being "independently" something. Substitution is anticipated on the organic groups of the compounds of the present invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with 0, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like.

Unless otherwise indicated, a reference to a "(meth) acrylate" compound (where "meth" is bracketed) is meant to include both acrylate and methacrylate compounds.

The term "polycarboxylic acid" includes both polycarboxylic acids and anhydrides thereof.

The term "acrylic" to meant that one or more (meth) acrylate and/or (meth)acrylic monomers are present.

The term "latex paint," as used herein, refers to a water-based paint having a wide range of viscosity from a thin liquid to a semi-solid paste. The paint consists of a polymeric binder or resin dispersed in an aqueous carrier and a dispersion of one or more pigments, colorants, tinting agents, and/or metal effect agent, plus various additives commonly used in paints and coating compositions such as, for example, fillers and extenders. The terms "latex," "water-based paint," and "emulsion paint" are used interchangeably herein.

The term "volatile organic compound" ("VOC"), as defined by the Environmental Protection Agency (EPA) in 40 C.F.R. 51.100(s), refers to any compound of carbon, excluding carbon monoxide, carbon dioxide, carbonic acid, metallic carbides or carbonates, and ammonium carbonate, which participates in atmospheric photochemical reactions. Typically, volatile organic compounds have a vapor pressure equal to or greater than 0.1 mm Hg. As used herein, "volatile organic compound content" ("VOC content") is as measured by ASTM D6886 (Standard method for determination of the weight percent of individual volatile organic compounds in waterborne air-dry coatings by gas chromatography) using methyl palmitate as the boiling point marker. The weight of VOC per volume of the coating solids, and is reported, for example, as grams VOC per liter (g/L).

As used herein, the term "low VOC" means the compositions described herein have less than about 30 g/L VOC. Unless otherwise indicated, the terms "low VOC" and "substantially free of VOC" are used interchangeably herein.

The term "paint" or "coating" refers to a film applied as a thin layer to a substrate. The film may be clear or contain pigment, colorant, dye, tinting agent or metal effect agent. The paint may be opaque or transparent. The terms "paint" and "coating" are used interchangeably herein.

As used herein, the term "low odor" refers to a paint or coating that is low VOC and does not emit an odor conventionally perceived as strong and/or undesirable. For example, a low odor paint or coating as described herein will not give off a strong ammonia odor.

Unless otherwise indicated, the term "polymer" includes both homopolymers and copolymers (i.e., polymers of two or more different monomers).

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

The present description provides a low odor water-based, quick drying coating composition. The composition described herein is particularly advantageous when used as a road marking paint because the paint has low odor relative to conventional road marking paints. The composition described herein is particularly advantageous when used as a surface paint, such as roofs, because the paint has low odor relative to conventional commercial exterior paints. The coating composition dries rapidly at ambient temperature without the application of heat or other drying means.

The present description includes a coating composition. In a particularly preferred embodiment, this invention relates to a low odor water-based composition that includes a binder component and a neutral zing component. The coating composition described herein may be used in one or more methods where a quick drying paint or sealant is required. In particular, the coating composition described herein may be used as a road marking paint that dries in less than about 10 minutes at temperatures between about 5° C. to 35° C. at relative humidity of 30 to 95%. In other related embodiments, the coating composition described herein may be used as an external surface paint that dries in less than about 10 minutes at temperatures between about 5° C. to 35° C. at relative humidity of 30 to 95%.

In an embodiment, the present description provides a coating composition including a binder component; which preferably includes a latex or alkyd, and even more preferably includes a latex. In an aspect, the hinder component is a copolymer or copolymer blend including one or more ethylenically unsaturated monomers. In an aspect, the copolymer has a Tg–20 to 60° C., more preferably –10 to 50° C., and most preferably 0 to 40° C., which is calculated by means of the Fox equation.

The copolymer described herein may be made by any conventional method known to those of skill in the art including, for example, emulsion polymerization, solution polymerization, suspension polymerization, dispersion polymerization, bulk polymerization and the like. In a preferred aspect, the copolymer described herein is an aqueous emulsion or latex produced by an emulsion polymerization process.

In an embodiment, the binder component described herein has low viscosity of preferably less than 700 mPa·s, more preferably less than 600 mPa·s, and most preferably less than 500 mPa·s.

In an embodiment, the binder component described herein has solids content of at least about 40%, preferably 40 to 75%, and more preferably 45 to 60%. In a preferred aspect, the solids content of the binder component is about 50%.

In an embodiment, the binder component described herein has a minimum film forming temperature (MFFT) of preferably about 0 to about 55° C., and more preferably about 0 to 20° C.

In some embodiments, the binder component includes a first resin component and a second resin component. The first and second components may be separately polymerized and mixed together after polymerization to form a copolymer blend, or the first and second component may be formed by emulsion polymerization, where the first and second components together form a copolymer blend. While the first and second resin components are typically present as separate components in the blend (e.g., components that are not covalendy attached to one another), it is contemplated that at least some (or even all) of the first and second resin components can be present in a copolymer including one or more portions formed for the first resin component and one or more portions formed from the second resin component.

In an embodiment, the first component includes an acrylic polymer component derived from one or more ethylenically unsaturated monomers. Examples of such monomers include, without limitation, acrylic acid, methacrylic acid, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, hydroxyethyl acrylate, hydroxyethyl methacrylate, hydroxybutyl acrylate, hydroxybutyl methacrylate, glycidyl methacrylate, 4-hydroxybutyl acrylate glycidyl ether, 2-(acetoacetoxy)ethyl methacrylate (AAEM), diacetone acrylamide (DAAM), acrylamide, methacrylamide, methylol (meth)acrylamide, styrene, α-methyl styrene, vinyl toluene, vinyl acetate, vinyl propionate, allyl methacrylate, and mixtures thereof. Preferred monomers include styrene, methyl methacrylate, methacrylic acid, AAEM, DAAM, butyl acrylate, and the like.

In an embodiment, the first component includes a (meth) acrylic polymer component derived from one or more polyfunctional acrylates. Suitable polyfunctional acrylates include, for example, di-, tri- and tetra-functional acrylates such as dipropylene glycol diacrylate (DPGDA), propoxylated glyceryl triacrylate (GPTA), pentaerythritol tetraacrylate, dipentaerythritol tetraacrylate, mixtures thereof, and the like. Preferred polyfunctional acrylate monomers include pentaerythritol tetraacrylate, dipentaerythritol tetraacrylate, and the like.

In a preferred embodiment, the first component is an emulsion polymerized latex copolymer, more preferably a latex copolymer having anionic (e.g., base-neutralized acid groups) or cationic groups (e.g., acid-neutralized groups).

In an embodiment, the second component includes a polyamine component. The polyamine may be a non-polymer, an oligomer, or a polymeric component. In a preferred aspect, the polyamine component has at least one amino group, preferably 1 to 5 amino groups, more preferably 2 to 4 amino groups. In an aspect, the polyamine component is water-soluble and may be applied as a solution or as part of a latex coating composition. The polyamine component is present in an amount of at least about 0.1 percent by weight, preferably 0.1 to 2 percent by weight, more preferably 0.2 to 1 percent by weight, based on the total weight of the coating composition.

Suitable polyamine components may be derived from one or more amino-functional compounds including amine-terminated aliphatic or cycloaliphatic hydrocarbons, polyimines, polyethers, polyamides, polyquarternary ammonium salts, compounds derived from epichlorohydrin, polyesters, polycarbonates, polycaprolactones, and the like, and combinations and mixtures thereof. Preferred polyamine components include polyimines such as polyethyleneimine, polypropylenimine, and mixtures and combinations thereof.

In formula (I), having the formula X(acid)-P(spacer)-A (amine), where X is a divalent organic group, preferably having 2 to 20 carbon atoms, more preferably 3 to 5 carbon atoms. In an aspect, X is a divalent organic group of formula C1 to C10 alkyl, C2 to C10 alkylene, or C3 to C10 cycloalkyl. In a preferred aspect, X is a divalent organic group of formula —(CH$_2$)$_m$, —, where m is preferably an integer from 0 to 10, more preferably from 1 to 8.

In certain preferred embodiments, the polyamine component is derived from ingredients including one or more ethylenically unsaturated monomers having an amine group. Acrylated amines are examples of such monomers, with acrylated tertiary amines being preferred such compounds. Specific examples of preferred such monomers include 2-(dimethylamino)ethyl methacrylate, 2-(dimethylamino) ethyl acrylate, 2-diethylamino)ethyl methacrylate, 2-(diethylamino)ethyl acrylate, vinyl pyridine and tertiary butyl amino methacrylate, and mixtures thereof.

Suitable polyamine components useful in the coating composition described herein preferably have molecular weight of at least 150, more preferably at least about 400, and most preferably at least about 700. Suitable polyamine components have molecular weight no more than about 200,000, more preferably no more than about 100,000, and more preferably no more than about 50,000. In an aspect, the polyamine component described herein has molecular weight of about 500 to 50,000, more preferably 600 to 20,000, and most preferably 700 to about 10,000.

In an embodiment, the polyamine component has low acid content. The acid content is preferably no greater than about 10%, preferably no greater than 5%. In an aspect, the acid content ranges from about 0.1% to 10%, preferably 0.5 to 5%, more preferably 1 to 3%. As described herein, the above acid contents are calculated based on the total weight of acid functional monomer, relative to the total weight of monomers used to generate the polymer.

The present description provides a water-soluble coating composition that includes a binder component and a neutralizing agent. In an aspect, the neutralizing agent is used to adjust the pH of the binder component during emulsion polymerization or during blending or formulation. The pH of the coating composition (as opposed, e.g., to the binder component used to make the coating composition) is less than 9.5, more preferably less than 9, and even more preferably less than 8.7. Typically, the pH will be greater than about 7, more typically greater than 8. The preferred pH range for the coating composition is 7 to 8.7, more preferably 8 to 8.5.

In an embodiment, the neutralizing agent is any organic or inorganic component that is a strong or weak base. In a preferred aspect, the neutralizing agent is a non-volatile compound or a compound of low volatility relative to ammonia. Suitable neutralizing agents include, for example, amine-containing bases like dimethylamine, diethylamine, aminopropanol, 2-amino-2-methyl-1-propanol (AMP), and the like; hydroxide-containing bases such as potassium hydroxide (KOH), and mixtures and combinations thereof. In a preferred aspect, the neutralizing agent is a 1:1 mixture of KOH and AMP.

In an embodiment, the coating composition described herein includes an amount of the neutralizing agent sufficient to adjust the pH of the coating composition to the desired level. Preferably, no more than 5 percent by weight of the neutralizing agent is used, more preferably about 0.5 to 4 percent by weight, and most preferably about 1 to 3 percent by weight, based on the total weight of the coating composition.

In an embodiment, the neutralizing agent is in a solution of one or more non-volatile bases in a solvent. Suitable solvents include, with limitation, alcohols such as, for example, butyl glycol, butyl diglycol, ethyl diglycol, Dipropylene Glycol n-Butyl Ether, Tripropylene Glycol n-Butyl Ether and the like; or coalescents like TEXANOL, EPS 9147, and the like. In a preferred aspect, the neutralizing agent is a solution in a solvent mixture of butyl diglycol and TEXANOL. The concentration of the neutralizing agent solution is preferably about 0.1 g/L to 10 g/L, more preferably 0.5 g/L to 5 g/L, and most preferably 1 g/L to 3 g/L.

The coating composition described herein may be used to make an aqueous road marking paint. Conventionally, road marking paints are made with ammonia (NH$_4$OH) as the neutralizing agent. Using ammonia to adjust the pH of the road paint composition is advantageous because ammonia is a volatile base with sufficiently high vapor pressure and volatility to evaporate out of the paint and allow the paint to dry and/or harden very quickly, typically in less than 20 minutes at ambient temperature (up to about 30° C.) and relative humidity (up to about 50%). To achieve the desired fast dry properties, while being sufficiently stable, such conventional ammonia-adjusted "fast dry" road paint compositions generally have a pH greater than 10. Fast hardening paints of this type are described in detail in U.S. Pat. No. 6,075,079, for example, and demonstrate optimal physical and mechanical properties when used as road marking paint. However, these paints have a strong ammonia odor and evaporation of ammonia from road paint increases VOCs in the environment. There is a desire to eliminate the use of ammonia to produce a low odor paint that has the same performance characteristics as the ammonia-containing composition.

Accordingly, in one embodiment, the coating composition described herein is substantially free, or even essentially free, of ammonia. If used, the composition includes no more than 0.5 percent by weight, preferably no more than 0.1 percent by weight of ammonia, based on the total weight of the coating composition. Surprisingly, the coating composition described herein, when used as a road paint, shows comparable and even improved dry time relative to commercially available road paints even though the compositions described herein do not include significant quantities of ammonia.

Moreover, the coating compositions described herein have improved cure time at a lower pH when compared to conventional ammonia systems. Furthermore, the coating composition described also exhibits good long-term storage stability at the lower pH. Moreover, the coating compositions described herein demonstrate optimal mechanical properties including, for example, dry-to-touch time of less than about 20 minutes, preferably less than 10 minutes, at a temperature of 25° C. at 50% relative humidity. Preferred embodiments, also exhibit dry-to-touch times of less than 20 minutes at one or both of the extremes of (i) temperature as low as 5° C. under corresponding ambient relative humidity conditions for such temperature or (ii) relative humidity as high as 95% at a corresponding ambient temperature for such humidity (e.g., up to 35° C.).

In an embodiment, the coating composition described herein includes a sufficient amount of pigment or filler such that the ultimate coating includes from about 10 to 80 vol %, preferably 20 to 70 vol %, more preferably 30 to 60 vol % based on the total volume of the dried coating, i.e. the pigment volume concentration (PVC). Without limiting to theory, it is believed that PVC plays an important role in the mechanical properties of the paint film. At optimal PVC, the filler or pigment particles may alter the surface energy of the coating composition in a way that affects solvent evaporation, surfactant migration, and film formation when the paint is applied to a substrate. In a preferred aspect, the coating composition described herein has a PVC of about 60%.

The present description provides one or more methods for making a low odor water-based, quick drying coating composition. In one embodiment, the method includes the steps of forming an initial resin mixture using a first resin component derived from one or more ethylenically unsaturated monomers. The second resin component, a polyamine, is then added to the first component to form a copolymer blend. In the alternative, the two components may be combined by emulsion polymerization. A solution of a neutralizing agent is added to the copolymer blend or to the emulsion polymer formed, and the water-based coating composition is formulated using any other additives necessary to make and apply a paint. In another embodiment, the neutralizing agent is added to the initial resin mixture prior to blending with the second resin component or prior to emulsion polymerization.

The coating composition may be prepared by conventional emulsion polymerization methods known to those of skill in the art. Exemplary methods are described, without limitation, in U.S. Pat. Nos. 7,834,086; 8,658,286 and 9,359,520, which are incorporated herein by reference.

The coating composition described herein may include other components or additives, added to either the copolymer blend during polymerization or during formulation of a paint. Suitable additives are known to those of skill in the art and include, for example, surfactants, pigments, colorants, open time agents, additional pH adjustors, initiator and chaser solutions, cross-linking agents, preservatives, defoaming agents, anticorrosive agents, and combinations thereof.

In an aspect, the coating composition described herein can be used in a latex paint that further includes one or more additives necessary for formulating a paint composition. Suitable additives include, without limitation, fillers, thixotropes, rheological modifiers, matting agents, and the like. The additives may include one or more ingredients added to a paint to modify the properties or enhance paint performance during storage, handling, application and other or subsequent stages. Desirable performance characteristics of a paint formulation include, for example, dry-to-touch time, dry through time, water absorbance and recovery, chemical resistance, abrasion resistance (i.e. scrub resistance), hardness, gloss, reflectivity, appearance and/or a combination of such properties and similar other properties.

The coating compositions described herein can be used to as a quick drying coating for a wide variety of substrates, including for example, asphalt, concrete, masonry, stone, brick, other architectural surfaces, building exteriors, building interiors, and the like. The substrates may be smooth, rough, or porous. The coating composition is typically applied at a thickness of about 2 to 15 mil wet film thickness and allowed to dry at ambient 400 micron wet film conditions. Typical dry film thickness is preferably about 1 to 10 mil, more preferably 5 to 8 mil.

In an embodiment, the water-based coating composition may be used as a traffic or road marking paint. Because the composition dries quickly, it is ideal for forming a hard, smear-resistant film at ambient temperatures very soon after being applied. When used as traffic or road marking paints, the composition demonstrates optimal dry time, abrasion resistance, heat stability, freeze/thaw stability, recovery from water absorption, and hide.

In another embodiment, the coating composition described herein may be used in spray foam applications. Spray foam is often used as insulation and hardens quickly at moderate temperature and humidity. However, when the foam is not properly mixed or applied, the foam will collapse before it hardens. With the coating composition described herein, the rapid dry time of the composition allows the foam to harden before the foam structure collapses.

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims. The invention illustratively disclosed herein suitably may be practiced, in some embodiments, in the absence of any element which is not specifically disclosed herein.

EXAMPLES

The invention is illustrated by the following examples. It is to be understood that the particular examples, materials, amounts, and procedures are to be interpreted broadly in accordance with the scope and spirit of the inventions as set forth herein. Unless otherwise indicated, all parts and percentages are by weight and all molecular weights are weight average molecular weight. Unless otherwise specified, all chemicals used are commercially available from, for example, Sigma-Aldrich, St. Louis, Missouri.

Test Methods

Unless indicated otherwise, the following test methods were utilized in the Examples that follow. Unless otherwise noted, reported readings are the average of duplicate measurements for each sample.

Dry-to-Touch Test

The dry-to-touch test is used to assess the speed with which a paint applied to a substrate surface will dry to the point of resisting mechanical stress and showing no pick up when touched with an object such as a finger, for example. For this test, a film of 400 micron thickness of a test sample is applied to a glass plate. The plate is then placed in a drying chamber to allow the paint to dry. The drying chamber is 23° C. at 40 to 60% humidity. The film is evaluated every five minutes and dry-to-touch time is recorded as the first time point (in minutes) at which paint no longer sticks to the object used to touch the film.

Water Absorbance/Soak Test

The water absorbance test is used to determine how much a water a paint or coating will absorb when submerged in water for a specific period of time. With respect to road paint, this test provides a measure of how the paint or coating will behave when exposed to rain and other wet weather conditions. For this test, a drawdown of 400 micron thickness is made on a Leneta card, where one side of the card is sprayed to determine, water uptake where the sprayed card is allowed to dry for 24 hours (8 hours at room temperature and 16 hours at 50° C.). When the film is dry, the card is submersed in water and the weight of the card is noted at time intervals of 1, 2, 4, 6, 8, and 24 hours after submersion with excess water removed before weighing. Results are noted as percent weight gain.

Recovery after Water Absorbance

The recovery test is used to determine how quickly a paint or coating will release water after submersion. A paint film is applied on a Leneta card as in the water absorbance test. The card is then allowed to dry at room temperature and water loss from the paint is measured by weighing the card every 10, 20, 30 minutes and at 1, 2, 4, 8, and 24 hours to detect changes in weight. Recovery is observed as the time point at which the weight of the card does not change between weight measurements.

Paint Weight Loss Test

To determine the time for an applied paint or coating to dry through, a wet film of paint is applied to a Leneta card at a thickness of 400 microns and allowed to dry at ambient temperature. The card is then weighed every ten minutes up to 30 minutes, and then every 1, 2, 4, 8, and 24 hours. The paint is considered to be dry through when the weight loss is stable, i.e. the weight of the paint does not change.

Chemical Resistance

To mimic the conditions that road paint is typically exposed to, a film applied to a Leneta card at film thickness of 400 microns is submersed in water and then exposed to various chemicals including ammonia, butyl glycol, clean oil, dirty oil, diesel fuel, and 5% sodium dodecyl sulfate (SDS). Chemical resistance is reported on a scale from 1 to 5, where 1 represents severe damage to the coating and 5 represents no damage.

Example 1: Preparation of Coating Compositions

In at least one embodiment the acid containing polyamine is formed form an amine functional acrylic monomer, acid functional monomer, an initiator that is water soluble, a modifier to control molecular weight and water. In at least preparation, the water phase is heated to 60-65° C. The monomer phase is prepared consisting of amine functional monomer, acid functional monomer and modifier. In addition, the initiator is dissolved in water. This occurs when the temperature achieves at least 60-65° C., when the monomer and initiator feed is started. This feed is done over a 90 minute period, where the temperature remains between 60-65° C. Moreover the initiator feed is added over 150 minutes at 60-65° C. Once the initiator feed is complete, the post-reaction will take approximately 60 minutes and will results in solids content of approximately 27.5% with a slightly hazing appearance.

As described above, by creating a distinct water solubility for the poly-amine, the poly-amine resides in the water phase. By the addition of ammonia the interaction between the acid groups in the polymer and the amine group in the poly-amine are reduced resulting in a stable low viscous latex. While not being bound by any particular theory, the addition hydrophilic groups, in this case acid groups, to the poly-amine water solubility is controlled to provide a balance between (drying) properties and neutralization level. Reducing the neutralization level a low odor can be created.

Removing the hydrophilic groups, the poly-amine is still water soluble, but requires a higher neutralization level with ammonia to provide a stable low viscous latex. The high ammonia content gives a high odor with good drying properties. By incorporation of less hydrophilic groups, the water solubility of the poly-amine is reduced. By reducing the water solubility a particle character is created, resulting in a further reduction of ammonia required to provide a stable latex. However by the creation of a particle character of the poly-amine the drying times are increased again to the level of adding no poly-amine.

The ingredients shown in Table 1A were charged to a high speed mixing vessel to make an initial resin blend with a pigment volume concentration (PVC) of 60. All listed amounts are percent by weight based on the total weight of the initial resin blend.

TABLE 1A

| Resin Blend | | |
| --- | --- | --- |
| INGREDIENT | (%) | |
| Water | 3.58 | |
| Tegofoamex 810 | 0.10 | Defoamer |
| PC Mull GR 100 | 7.16 | Grind Resin |
| NH4OH (18%) | 0.10 | pH |
| Butyl Glycol | 0.61 | Solvent |
| Tronox CR 826 | 23.32 | Pigment |
| Durcal 5 | 5.83 | Filler |
| Sikron M300 | 23.32 | Filler |
| Blend with: | | |
| Acrylic copolymer | 35.79 | Binder |
| Tegofoamax 800 1/1 | 0.20 | Defoamer |
| Total | 100.00 | |

The initial resin blend from Table 1 A is mixed with a second polymer blend including a polyamine-functional component to make test road paint formulations #1 to #6 as shown in Table 1B.

TABLE 1B

| Test Formulations | |
| --- | --- |
| Test Paint | Amount of Second Copolymer (% w/w) |
| 1 | — |
| 2 | 1 |
| 3 | 2 |
| 4 | 3 |
| 5 | 4 |
| 6 | 5 |

Example 2. Dry to Touch Testing

Test paint formulations #1 to #6 were each applied to a glass plate at a film thickness of 400 microns and then allowed to dry at room temperature and relative humidity of 50%. For comparison, a commercially available water-based latex formulation (Dow FastTrack) is used as a control. Results are reported in minutes for each set of test samples.

TABLE 2

| Dry to touch time | | | | | | | |
| --- | --- | --- | --- | --- | --- | --- | --- |
| Sample | Control | 2-1 | 2-2 | 2-3 | 2-4 | 2-5 | 2-6 |
| RT (min) | 20 | 45 | 35 | 35 | 30 | 35 | 35 |

Example 3: Effect of Solvent

To determine the effect of different solvents on dry-to-touch time, various solvents as were added to the test formulations #1, #3, and #5 from Example 1 (Table 1B) at solvent concentrations of 2% and 4%. Each test formulation was applied to a Leneta card at a film thickness of about 75 microns and allowed to dry in a climate chamber at room temperature and 50% relative humidity. Dry-to-touch times were determined as described in Example 2 and shown in FIG. 1, along with the time taken to obtain a visually dry film.

Example 4: Effect of Pigment Volume Concentration (PVC)

To determine the effect of pigment volume concentration on the various performance parameters of an exemplary road traffic paint, sample formulations at various PVC levels using Test Formulation #4 from Example 1 as shown in Table 4A. A commercially available road marking paint (DOW FasTrack) was used for comparison.

Dry-to-touch time was determined as described in Example 2. Results are shown in Table 4B.

For other performance testing, formulations as in Table 4A were applied to a Leneta chart at a film thickness of about 400 micron and subjected to various tests as described above. Results are shown in FIG. 2A-2E.

TABLE 4A

Test Formulations at Different PVC

| Sample | PVC |
|---|---|
| RP1 | 40 |
| RP2 | 50 |
| RP3 | 60 |
| RP4 | 70 |
| Commercial product (FastTrack) | N/A |

TABLE 4B

Dry-to-touch Time at Different PVC

| | Dry-to-touch time (min) | | |
|---|---|---|---|
| Sample | 24 h | 1 wk | 4 wk |
| RP1 | 42 | 38 | 32 |
| RP2 | 48 | 42 | 38 |
| RP3 | 42 | 32 | 48 |
| RP4 | 28 | 32 | 32 |
| Commercial product (FastTrack) | 18 | 18 | 18 |

Example 5: Effect of Molecular Weight and Acid Value

To determine the effect of molecular weight and acid number, test formulations of road paint were prepared and included a copolymer blend of an acrylate resin and a polyamine-functional monomer with acid number and molecular weight as shown in Table 5. The polyamine-functional monomer is included at about 3 wt % and the test formulations have PVC of 60. A commercially available road marking paint (DOW FasTrack) was used for comparison, and the acrylate resin was used as a control. Dry-to-touch time was determined at 60% relative humidity and results are shown in Table 5.

TABLE 5

Dry-to-touch time

| Sample | Acid % of polyamine | Molecular Weight (Mn) | Dry-to-touch (min) |
|---|---|---|---|
| Control (100% acrylic polymer) | — | — | 48 |
| 1 | 1 | High | 45 |
| 2 | 1 | Moderate | 38 |
| 3 | 1 | Moderate | 45 |
| 4 | 2 | High | 45 |
| 5 | 2 | High | 45 |
| 6 | 4 | High | 45 |
| 7 | 4 | High | 38 |
| 8 | 0.5 | High | 48 |
| 9 | 0.5 | High | 38 |
| 10 | 4 | Low | 38 |
| 11 (Test paint #4 from Table 1B) | 1 | High | 28 |
| Commercial paint (FasTrack) | — | — | 18 |

Example 6. Effect of Neutralizing Agent

Commercial road marking paints have high pH and a strong ammonia odor, but a short dry-to-touch time and optimal performance characteristics. To determine the effect of alternate neutralizing agents on both dry-to-touch time and performance of the road paint, the test formulation from Example 1 was prepared using a binder that is a copolymer blend of a 100% acrylic polymer and a polyamino-functional component at 3 wt %, based on the total weight of the binder. The solvent system of Example 1 was changed to a blend of ethanol and butyl glycol that included different amounts of a 33% solution of a neutralizing agent (a mixture of AMP and KOH) as shown in Table 6. The test formulations had solid content of 80% and were formulated at a PVC of 60. The test formulations were applied and tested at described above. Dry-to-touch times at room temperature and 50° C. are reported in Table 6, and performance characteristics are shown in FIGS. 3A-3E.

TABLE 6

Effect of Neutralizing Agent

| Sample* | Neutralizing Agent #1 (1 g/L) | Neutralizing Agent #2 (2 g/L) | Dry-to-touch time (min) | |
|---|---|---|---|---|
| | | | RT | 50° C. |
| 1 | 3.36 | — | 10 | 15 |
| 2 | — | 3.14 | 20 | 20 |
| 3 | — | 0.71 | 5 | 10 |
| 4 | — | 0.48 | 10 | 15 |
| 5 | — | 0.24 | 10 | 10 |
| Control (100% acrylic copolymer) | 3.36 | — | 35 | 30 |
| Control (100% acrylic copolymer) | — | 0.24 | 25 | 20 |
| Commercial (FasTrack) | — | — | 20 | 20 |

*Paints solidified over time and gelled after 2-3 weeks

Example 7. Optimization of Road Paint

The test paint formulations of Example 6 were optimized to provide a road marking paint with optimal dry-to-touch time and performance characteristics that would remain stable for at least one year at room temperature or for at least four weeks at 50° C. For each test sample from Example 6, a neutralizing agent containing a mixture of AMP and KOH was added to the initial resin component while blending with the polyamino-functional component. The test formulations had solid content of 75% and were formulated at a PVC of 60. The test formulations were applied and tested as described above at 8° C. and relative humidity of 100% to simulate conditions when the paint is applied to a road surface. Polymer is anionic stabilized, neutralized with ammonia, containing acrylic monomers. Final pH between 7.5 and 8.5, more preferably between 7.5-8.0 Drying times at 8° C. and a humidity of 100%. Dry-to-touch times are reported in Table 7, and performance characteristics are shown in FIGS. 4A-4D.

TABLE 7

Dry-to-touch time

| Sample | Neutralizing Agent | Dry-to-touch (min) |
|---|---|---|
| 1 | 2* | 20 |
| 2 | 2 | 20 |
| 3 | 2 | 20 |
| 4 | 2 | 20 |
| 5 | 2 | 20 |
| 6 | 3** | 25 |
| 7 | 3 | 25 |
| 8 | 3 | 25 |
| 9 | 3 | 25 |
| 10 | 3 | 25 |
| 11 (Control) | 1*** | (hardened) |
| 12 (Control) | 2 | (hardened) |
| Commercial paint (FastTrack) | — | >60 |

*2 g/L solution
**2.5 g/L solution
***1 g/L solution

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims. The invention illustratively disclosed herein suitably may be practiced, in some embodiments, in the absence of any element which is not specifically disclosed herein.

What is claimed is:

1. A method, comprising:
   providing a binder component comprising:
      a first resin component comprising a latex polymer derived from one or more ethylenically unsaturated monomers, and
      a second resin component comprising a polyamino-functional polymer, wherein the polyamino-functional polymer has acid functionality, and wherein the polyamino-functional polymer has an acid content of about 0.5% to 10% based on the total weight of acid functional monomer relative to the total weight of monomers used to generate the polymer; and
   causing the binder component to be formulated into a low-odor water-based paint that is substantially free of ammonia, has a pH of less than 9.5, and dries in less than about 10 minutes at a temperature between about 5° C. to 35° C.

2. The method of claim 1 further comprising causing the low-odor water-based paint to be applied to a road surface.

3. The method of claim 1 further comprising causing the low-odor water-based paint to be applied to a roof surface.

4. The method of claim 1, wherein the polyamino-functional polymer has a number average molecular weight (Mn) of at least about 400.

5. The method of claim 4, wherein the polyamino-functional polymer is present in an amount of at least about 0.1 percent by weight, based on the total weight of the coating composition.

6. The method of claim 4, wherein the polyamino-functional polymer is present in an amount of 0.1 to 2 percent by weight, based on the total weight of the coating composition.

7. The method of claim 4, wherein the latex polymer has a Tg of −20 to 60° C.

8. The method of claim 1, wherein the polyamino-functional polymer comprises a copolymer of a (meth)acrylic acid-derived polymer.

9. The method of claim 1, wherein the polyamino-functional polymer is water-soluble.

10. The method of claim 1, wherein the polyamino-functional polymer is present in an amount of at least about 0.1 percent by weight, based on the total weight of the coating composition.

11. The method of claim 1, wherein the polyamino-functional polymer is present in an amount of 0.1 to 2 percent by weight, based on the total weight of the coating composition.

12. The method of claim 1, wherein the latex polymer is formed from reactants including one or more of (acetoacetoxy)ethyl methacrylate (AAEM) or diacetone acrylamide (DAAM).

13. The method of claim 1, wherein the low-odor water-based paint has a pigment volume concentration (PVC) of at least about 50%.

14. The method of claim 1, wherein the low-odor water-based paint has a pH of 7 to 8.7.

15. A method, comprising:
   providing a binder component comprising:
      a first resin component comprising a latex polymer derived from one or more ethylenically unsaturated monomers and having a Tg of −20 to 60° C., and
      a second resin component comprising a water-soluble polyamino-functional polymer having acid functionality, wherein the polyamino-functional polymer has an acid content of about 0.5% to 10% based on the total weight of acid functional monomer relative to the total weight of monomers used to generate the polymer; and
   causing the binder component to be formulated into a low-odor water-based paint that is substantially free of ammonia, has a pH of pH 7 to 9, and dries in less than about 10 minutes at a temperature between about 5° C. to 35° C., wherein the polyamino-functional polymer is present in an amount of at least about 0.1 percent by weight, based on the total weight of the low-odor water-based paint.

16. The method of claim 15, wherein the latex polymer is formed from reactants including one or more of (acetoacetoxy)ethyl methacrylate (AAEM) or diacetone acrylamide (DAAM).

17. The method of claim 15, further comprising causing the low-odor water-based paint to be applied to a roof surface.

* * * * *